July 29, 1958 P. L. WALSH 2,845,064
ORTHOPEDIC ANIMAL BRACE
Filed April 11, 1955 2 Sheets-Sheet 1
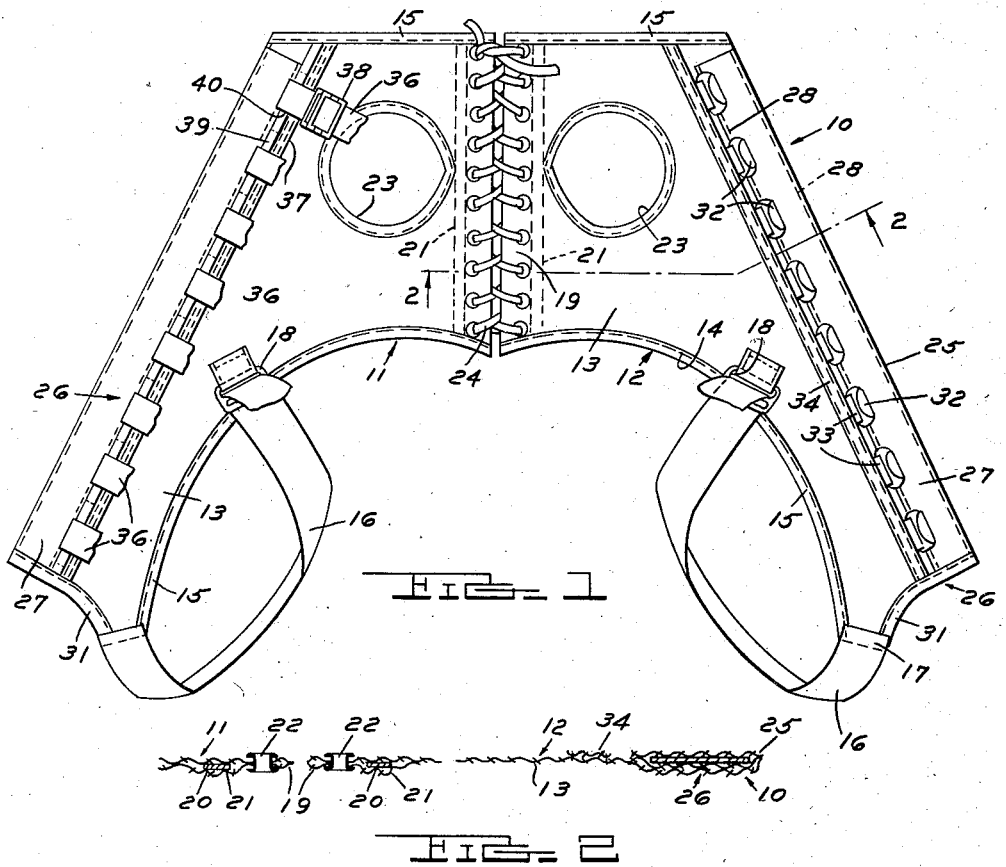
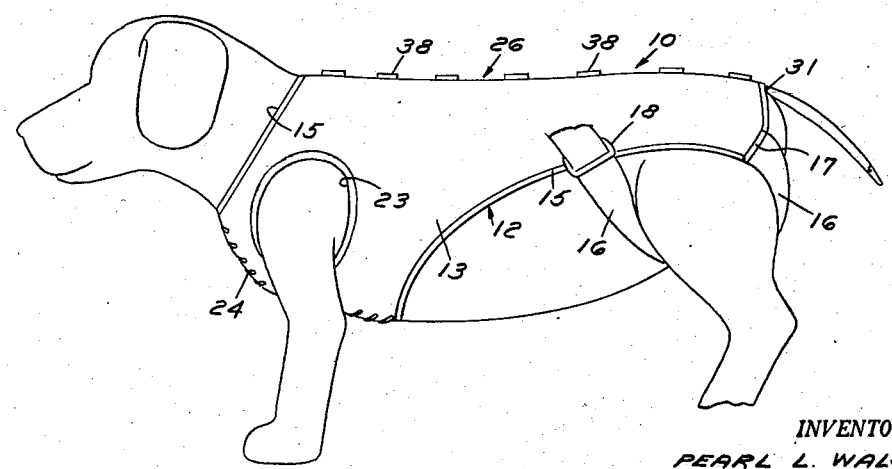
INVENTOR.
PEARL L. WALSH
BY Whittemore, Hulbert
Belknap ATTORNEYS July 29, 1958 P. L. WALSH 2,845,064
ORTHOPEDIC ANIMAL BRACE
Filed April 11, 1955 2 Sheets-Sheet 2

INVENTOR.
PEARL L. WALSH
BY Whittemore, Hulbert + Belknap
ATTORNEYS

# United States Patent Office 2,845,064
Patented July 29, 1958

2,845,064

ORTHOPEDIC ANIMAL BRACE

Pearl L. Walsh, Sturgis, Mich., assignor to Freeman Manufacturing Company, Sturgis, Mich., a corporation of Michigan Application April 11, 1955, Serial No. 500,376

4 Claims. (Cl. 128—78)

The present invention relates to an improved orthopedic brace for animals, in the form of a mechanical means to immobilize the spine. In securing this result the improvement hastens natural healing and the effect of medication, while at the same time relieving the animal of severe pain and attendant muscle spasm, which itself hinders a cure.

It frequently happens that as the result of an animal's injury, arthritis or other disease, a pressure or pinch is exerted on the nerves in an effect which is channeled through the spinal column and causes agonizing pain and muscle spasm. The spasm in turn occasions an increased pressure in the vertebral column, aggravating the pain. Such a causative pressure may arise from a so-called "herniated disc," a condition in which the cartilaginous material between the vertebrae deteriorates or ruptures. Portions of the disc then press on the nerves, or allow the vertebrae to slip out of position and press or pinch the nerves, with the results referred to above.

It is therefore a general objective of the invention to eliminate the cause of this extreme pain to the animal, and its effect particularly as compounded by muscle spasm, by providing an orthopedic brace including an elongated immobilizing brace device which is snugly held to the animal's body to directly overlie its spine. This bracing structure extends from the animal's tail to its withers so as to positively restrict and control lateral and vertical movement of the vertebral column.

More specifically, it is an object of the invention to provide a mechanical spine immobilizing means of this character which comprises two relatively rigid bars extending lengthwise of the spine in the manner described, together with means encircling the body of the animal under tension, so as to hold the bars in proper position and with proper force. The holding means takes the form of a vest-like fabric jacket on which the brace bars are mounted, with suitable openings and other provisions to receive the fore and hind quarters of the animal. The jacket is laced snugly to produce the desired immobilizing force at the brace bars, and thus guide the spinal column into a natural position to reduce or eliminate vertebral nerve pressure.

Still more specifically, the invention has as an object, the provision of a body encircling vest or jacket which is fabricated of a pair of generally similar halves, to a margin of each of which one of the immobilizing bars is secured. Adjustable strap and fastener means are provided along the length of the bars to enable the same to be positioned laterally relative to one another. Thus both bars may directly overlie the spinal zone, in superposed relation to one another, or the bars may be spaced laterally somewhat on either side of a median spinal zone. The body encircling snugness is then adjusted by lacing of the jacket, so as to secure proper pressure and a displacement resisting fit. With the spine immobilized in this fashion medication and natural healing can have their best effect.

The foregoing as well as other objects will be made more apparent as this description proceeds, especially when considered in connection with the accompanying drawings, wherein:

Fig. 1 is a plan view of the orthopedic brace in a flat, stretched-out position to best show its structural features and relationships;

Fig. 2 is a fragmentary view in somewhat enlarged scale along line 2—2 of Fig. 1;

Fig. 3 is a side elevational view of the brace as applied to a quadruped;

Figure 4:
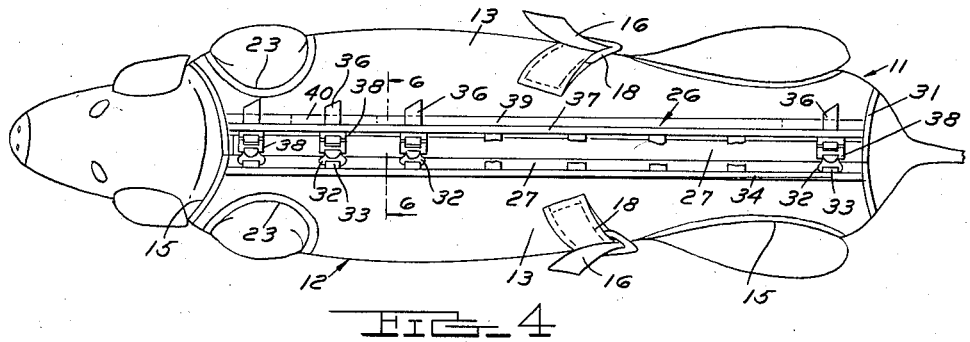
Figs. 4 and 5 are, respectively, top and bottom plan views of the brace as applied to the animal.
Figure 5:
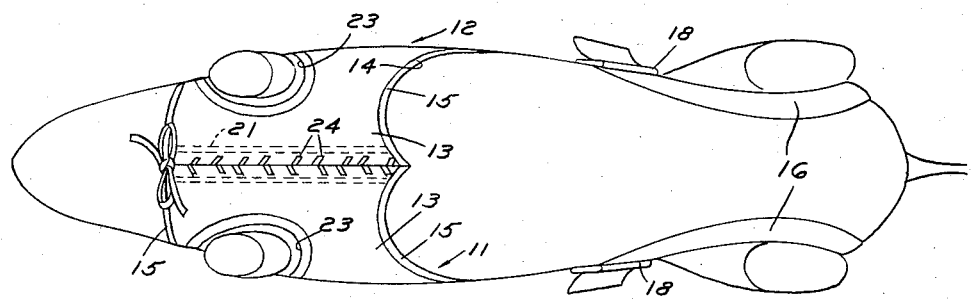

Referring to Fig. 1 of the drawings, the improved orthopedic spine immobilizing brace is generally designated 10. It consists of two generally similar shaped sections or halves 11, 12, of which corresponding parts are designated by corresponding reference numerals in the interest of avoiding duplicate description.

The sections 11, 12 each comprise a shaped body encircling vest or jacket section 13 of a suitable flexible fabric such as denim, canvas, cotton drilling or like material, preferably such as can be laundered without undue shrinkage. The section 13 is shaped to provide an arcuate margin 14 to accommodate the hind haunch of the animal, this margin being faced at 15 with a suitable tape. A rear leg encircling buckle strap 16, preferably of an elasticized fabric, is anchored at 17 to the outer end of this margin, and a buckle member 18 is anchored adjacent the edge of margin 15, inwardly of its rear extremity. This buckle member adjustably receives and secures the free end of leg strap 16.

The section 13 is reinforced somewhat (Fig. 2) along an inner and forward side margin 19 thereof by means of a flexible metallic spring strip 20 (Fig. 2). This strip is stitched in place along its length between the fabric of section 13 and a soft inner facing strip 21 of flannel or the like. Metallic eyelets or grommets 22 are secured in longitudinally spaced relation along margin 19, at the outer side of reinforcing spring 20.

A forward margin of section 13 is disposed at a 90° angle to margin 19 and is faced with tape 15 in the same way as the arcuate margin 14. Section 13 is also provided with a generally circular faced aperture 23 to one side of margin 19, which receives a forefoot of the animal, with the section 13 embracing the brisket. It is held in this snug body embracing position by conventional lacing 24 threaded in the eyelets 22 of the respective halves 11, 12 of the brace.

Figure 6:
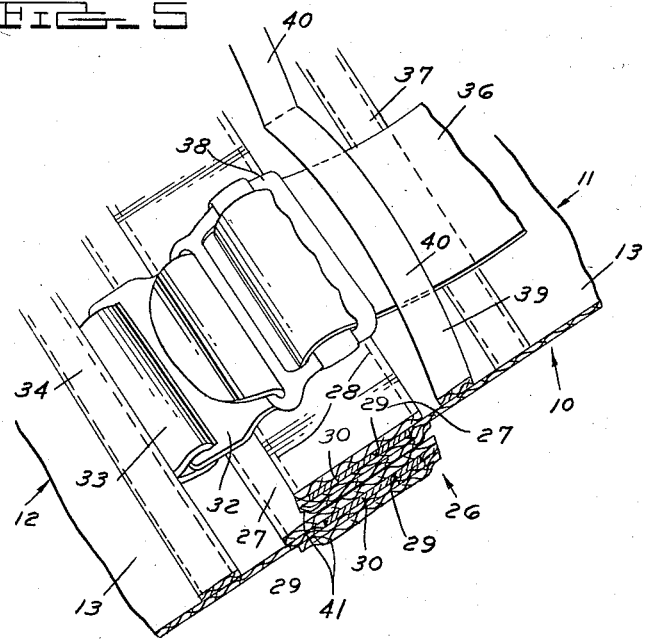
Fig. 6 is a fragmentary perspective and sectional view showing specific features of the bracing structure in enlarged scale, in its operative, applied position, being in section as generally indicated by the line 6—6 of Fig. 4.

A remaining, longitudinal extending outer side margin 25 of each of the sections 11, 12 mounts a spine immobilizing device or structure of the improved brace, which is generally designated 26 and is, per se, best illustrated in Fig. 6 of the drawings. Margin 25 extends at an obtuse angle to the forward margin of section 13, and in divergent relation to the inner margin 19. Along this margin, the material of the section has applied thereto an elongated length of appropriate facing 27 of a wear resistant web-like material. This length is secured to the section 13 adjacent its outer margin, as by parallel lines of stitching 28, to provide an elongated internal pocket 29, which receives an elongated brace bar 30. Bar 30 is preferably a length of steel strap which, though flexible in itself so as to "give" somewhat and fit the general contour of the spine, is still considerably more rigid than the other parts of the brace, hence serves as its spine immobilizing element. Once inserted in pocket 29 the brace bar 30 is secured in place, as by an end facing 31 stitched across section 13 from the strap anchor 17 to margin 25 of the brace structure.

Adjustable clip type fasteners are secured to the respective brace structures 26, the fasteners being in longitudinally spaced relation to one another. In the case of the one section 12 of the brace 10, these securing members may be in the form of hook-like clips 32 having short flexible tape bights 33 by which the clips are secured to the section. The bights are secured to the section 12 through the agency of an elongated bias strip 34 stitched in place along its length.

In the case of the other vest or jacket section 11 the securing members for the brace structure take the form of webbing straps 36 stitched in place along the inner margin of the structure by means of an elongated bias tape 39. The straps 36 carry slidable friction buckles 38 into which the hook clips 32 engage. An elongated retainer tape is tacked in place parallel to tape 39 at spaced points along its length, affording longitudinally spaced retainer bights or loops 40 in which the free ends of the buckle straps 36 may be inserted after taking up the same and doubling the same on themselves, as depicted in Figs. 4 and 6.

In order to reduce irritation by rubbing of brace device, a length 41 of soft flannel or the like, similar to the facing 21, is stitched along margin 25 to the inner surface of section 13.

In use, the brace is fitted snugly about the body of the animal, after inserting its hind quarters in the openings afforded by rear straps 16 and its forelegs in the openings 23 so as to position the device properly in lengthwise relation to the spine of the animal. An appropriate adjustment of the clip buckles 38 is made which will bring the brace bars 30 either into an immediate overlying relation to one another, as shown in Figs. 4 and 6, or in any desired spacing of the bars in lateral relation to one another and parallel to the animal's spine. The half sections 11, 12 are then taken up snugly about the animal's brisket by tensioning and securing the lacing 24.

Brace structures 26 afford a rigid support in longitudinal overlying relation to the spine, or in direct parallel adjacency to the spine, which immobilizes and guides the spinal column in its natural position. It alleviates pain and counteracts muscle spasm, thus expediting the effects of medication and natural healing. The device is extremely simple, inexpensive and easily applied. It can be supplied in a very few basic sizes to serve the needs of practically any breed of animal.

It is to be understood that modifications in unessential details of the brace structure are contemplated by the invention. For example, the size and shape of the body encircling sections 11, 12 may be varied, as by bringing the same further to the rear and omitting the rear leg straps 16, thereby affording an increased belly support for the animal. Other similar variations will readily occur to those skilled in the art.

What I claim as my invention is:

1. A brace to immobilize an animal's spine, comprising a pair of elongated, relatively rigid brace bars adapted to be disposed in generally parallel and overlying relation to the spine to extend longitudinally thereof, a flexible fabric body encircling member connected at margins thereof to said brace bars, said members having coacting adjustable fastening elements at said margins to releasably connect said brace bars in at least partially superposed relation to one another along the general zone of the spine, and adjustable tensioning means on said members in a zone remote from said spine zone to secure said members in encircling relation to the animal's body, said members each having an opening to receive a leg of the animal and hold the brace in fixed longitudinal relation to the spine.

2. An orthopedic animal brace comprising a body encircling member of flexible fabric provided with a pair of elongated pockets paralleling and overlying the spine of an animal wearing said member, an elongated metal bar received in each of said pockets, and means connected to said body encircling member to adjust and secure said pockets in relation to one another to bring said bars in overlying relation to one another along and over the spine zone.

3. An orthopedic animal brace comprising a body encircling member of flexible fabric provided with a pair of elongated marginal pockets paralleling and overlying the spine of an animal wearing said member, an elongated metal bar received in each of said pockets, and means to separably adjust and secure said marginal pockets in relation to one another to bring said bars in overlying relation to one another along and over the spine zone, said means comprising elements connected to the body encircling member inwardly of said respective marginal pockets and adjustably connected to one another.

4. An orthopedic animal brace comprising a body encircling member of flexible fabric provided with a pair of elongated marginal pockets paralleling and overlying the spine of an animal wearing said member, an elongated metal bar received in each of said pockets, and means to adjust and secure said marginal pockets in relation to one another to bring said bars in overlying relation to one another along and over the spine zone, said means comprising fastener straps and buckles connected to the body encircling member inwardly of said respective marginal pockets and adjustably connected to one another.

References Cited in the file of this patent

UNITED STATES PATENTS

| 1,595,834 | Griffiths | Aug. 10, 1926 |
| 1,924,016 | Barrows | Aug. 22, 1933 |